Feb. 28, 1961 — R. O. CONKLIN — 2,973,117
MEASURING AND CHARGING VALVE
Filed Dec. 16, 1957 — 2 Sheets-Sheet 1
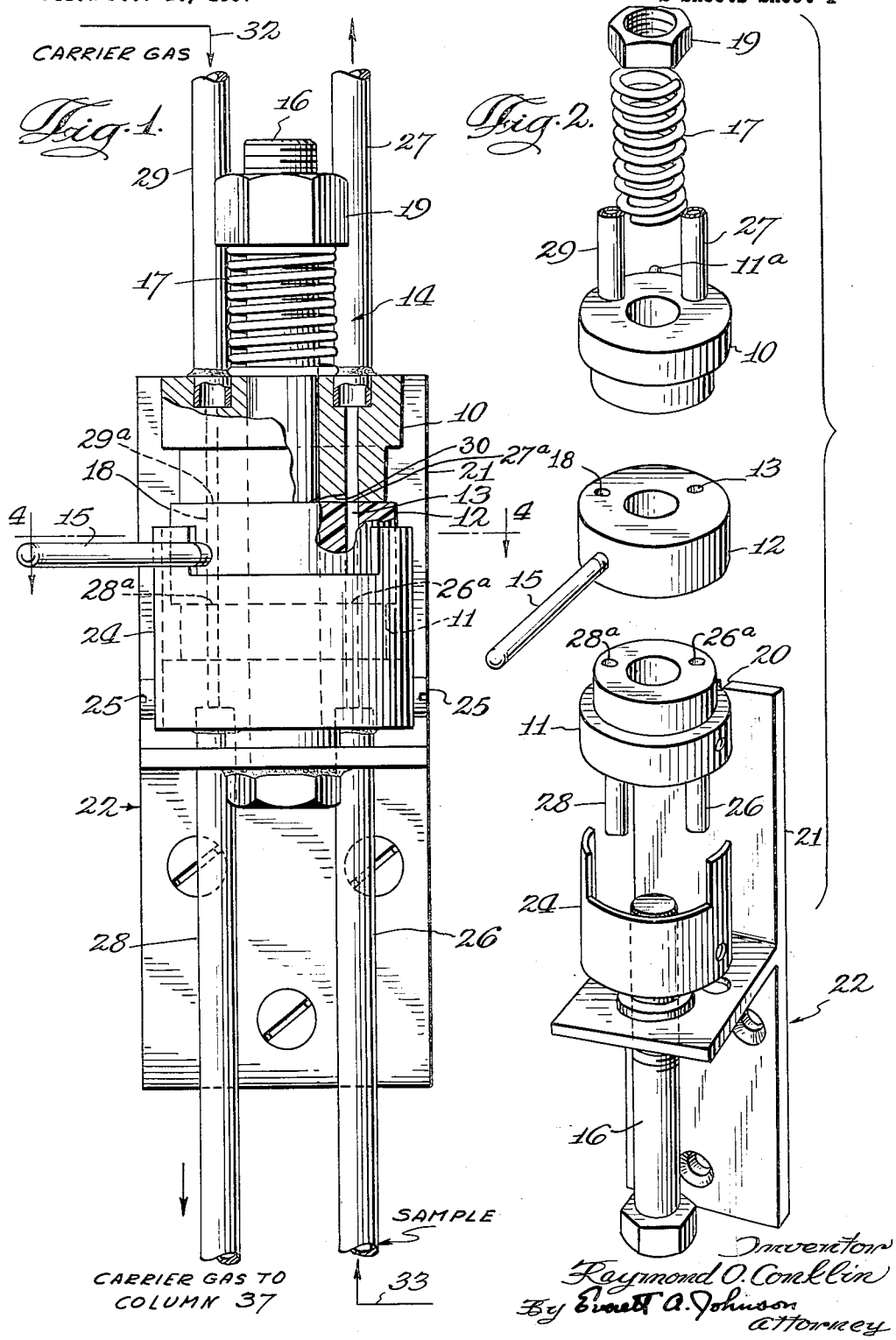
Inventor
Raymond O. Conklin
By Everett A. Johnson
Attorney

United States Patent Office 2,973,117
Patented Feb. 28, 1961

2,973,117
MEASURING AND CHARGING VALVE

Raymond O. Conklin, Union County, Ark., assignor to The American Oil Company, New York, N.Y., a corporation of Maryland Filed Dec. 16, 1957, Ser. No. 703,194

4 Claims. (Cl. 222—3)

This invention relates to a system for measuring and charging constant volume samples into a flowing stream. More particularly, it pertains to a device for measuring a gasiform fluid sample and injecting the sample into an analyzing instrument, such as a gas chromatography apparatus.

In many analytical procedures, it is desired to measure a precise and air-free sample both quickly and accurately for introduction into a gasiform fluid stream. For example, in work in connection with gas chromatography, uniform sized samples of fluids are injected into a chromatographic column through which an eluting gas flows. Samples of substantially less than 1 ml. and of the order of 1 to 40 ml. may be introduced. In some operations it is desired to introduce such samples repeatedly and continually. Further it is desired to introduce samples of the same or varying volume without disturbing the analytical instrument installation. It is also desired to employ injection apparatus which has a minimum hold-up of samples, is lubricant-free to avoid contamination and/or adsorption of the sample and to require a minimum of sample flow to clear the sampling chamber of the previous sample.

It is, therefore, a primary object of this invention to provide a system for measuring and charging controlled samples of fluids into an analytical instrument. It its a further object of the invention to provide a structure for such purposes which is rugged in construction, is foolproof in operation, is versatile with respect to sample size and is well adapted for routine analyses, both manual and automatic.

A further object of the invention is to provide an apparatus which is self-compensating with respect to wear so as to avoid any leakage to or from the sampling chamber. It is also an object of the invention to provide an apparatus which can be readily modified by interchange of a component so as to vary the capacity of the apparatus. Another object of the invention is to provide a system for introducing a precise sample into an analytical apparatus, such as a gas chromatography column by a minimum of manipulations. These and other objects of the invention will become apparent as the description thereof proceeds.

Briefly, I attain the objects of the invention by providing a device which comprises a plurality of ported segments which are retained in a spring-loaded array with one segment containing the sampling chamber arranged to be oscillated between a pair of conduits comprising the sample line and a second pair of conduits comprising the injection line. The sample is taken by aligning the sample chamber with the first pair of conduits, the chamber is then disposed laterally and brought into alignment with the second pair of conduits whereby the sample is displaced from the sample chamber by a gasiform fluid flowing through the second pair of conduits.

The apparatus is self-lubricating by virtue of the sample chamber segment being constructed of a waxy plastic such as Teflon which is not only self-lubricating but inert. The sampling device may be operated automatically in a timed cycle or in response to preselected process conditions.

Further details and advantages of the invention will be described in connection with the accompanying drawings illustrating embodiments of the invention and wherein:

Figure 1 is an elevation, partly in section, of the device with the measuring chamber in alignment with the sample line;

Figure 2 is an exploded perspective of the apparatus in Figure 1;

Figure 3:
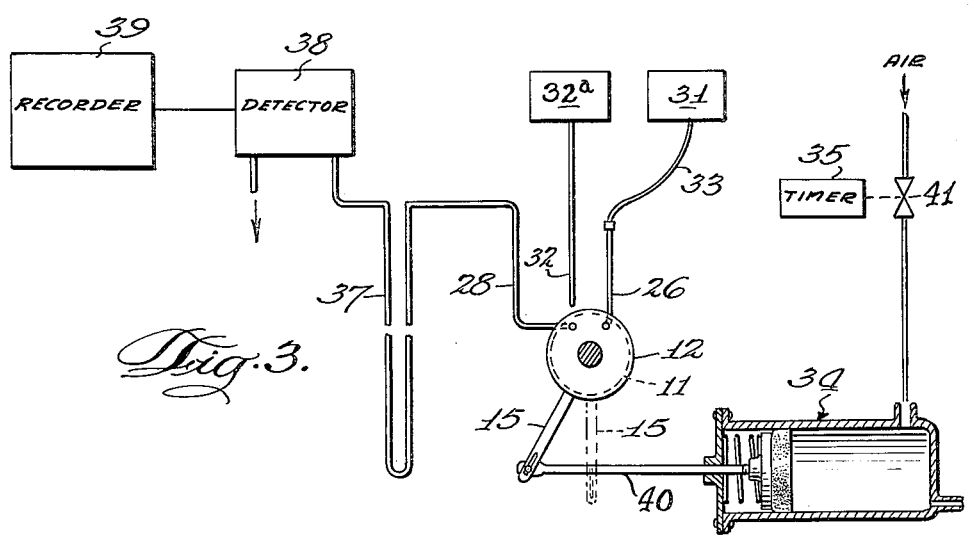
Figure 3 is a diagram of an automatic system employing the sample device constructed in accordance with my invention.

Referring to the drawings, the measuring and charging mechanism comprises a pair of upper and lower body segments 10 and 11, made of brass or stainless steel, and a measuring chamber segment 12, made of a self-lubricating plastic, such as Teflon or Kel–F. Teflon is tetrafluorethylene and Kel–F is trifluorchloralethylene. The measuring chamber segment 12 is provided with one or more sampling chambers 13 and the segment 12 is held in place between the body segments 10 and 11 by spring assembly 14. The measuring chamber segment 12 is turned by means of detachable arm 15 and such movement of the arm may be manually or by mechanical auxiliary means to be described below.

The lower body portion 11 is secured to shaft 16 whereas the body portion 10 is axially slidable along the shaft 16 with the measuring segment 12 arranged between the lower and upper body portions 11 and 10. The three segments 10, 11, and 12 are maintained in fluid-sealing contact but with the measuring chamber segment 12 rotatable, by means of the spring assembly 14 which comprises a coil spring 17 and a nut 19. A pin 11a fixed to the upper body portion 10 is held in slot 20 on the back plate 21 forming a part of the supporting bracket 22.

Figure 4:
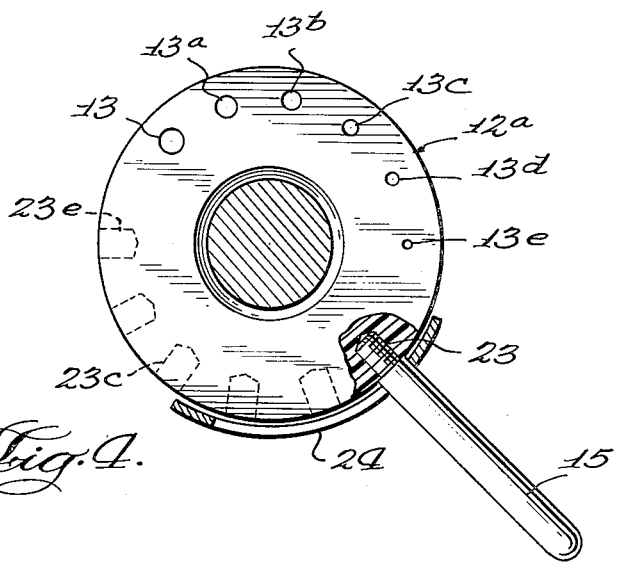
Figure 4 is an enlarged detail of an embodiment of the sampling segment viewed along the line 4—4 of Figure 1.

The measuring segment 12 is provided with at least one measuring chamber 13 but may be provided with a plurality of measuring chambers 13, 13a, 13b, 13c, 13d and 13e, such as shown in Figure 4. Only one arm 15 is necessary since it is removable and insertable into any one of the threaded sockets 23, each being associated with one of the measuring chambers 13, 13a, etc. A channel 18 is provided in segment 12 to allow the carrier gas to pass through the system without interruption while sampling chamber 13 is being filled. A by-pass (not shown) from carrier gas conduit 29 to conduit 28 can be provided in which event channel 18 would not be required. In operation the by-pass would be open at all times so that when measuring chamber 13 was aligned with conduits 26 and 27, thereby stopping carrier gas flow through conduits 28 and 29, the carrier gas would flow through the by-pass. When chamber 13 was aligned with conduits 28 and 29 the carrier gas flow would be split between the by-pass and conduits 28 and 29. The use of either channel 18 or the by-pass would allow continuous, intermittent, and automatic operation of sampling system.

The throw or travel and hence the extent of angular displacement of the particular measuring chamber 13 is controlled by the limiting quadrant 24 fixed, as for example, by screws 25 to the lower body portion 11.

The lower segment 11 is provided with a pair of conduits 26 and 28 comprising the sample inlet line and the carrier gas stream line, respectively, these extending through the segment 11. The upper segment 10 is provided with a corresponding pair of conduits 27 and 29 which are arranged in axial alignment with conduits 26 and 28, respectively. Conduits 26 and 28 terminate in ports 26a and 28a, and conduits 27 and 29 terminate in ports 27a and 29a. It will be seen that a sample measuring chamber 13 can be brought into alignment with 26—27 or 28—29, selectively, to take the sample from line 26—27 and discharge it into the gas stream flowing in line 28—29.

The face of upper segment 10 adjacent to the measuring chamber segment 12 is provided with a vent channel 30 communicating with outlet 27 and adapted to equalize the pressure on the measured sample trapped within chamber 13.

In the operation of my device, the tap 26 is connected to a source 31 of sample maintained under pressure and the tap 29 is connected into the carrier gas supply line 32 which in turn is connected to carrier gas source 32a. The measuring chamber 13 is moved into alignment with the conduits 26—27 and a sample is purged through the chamber 13 until it emerges freely from the conduit 27. If desired, the sample source 31 may be of the leveling-bulb type and connected to the inlet conduit 26 by a flexible connector 33.

When a full sample has been trapped within the measuring chamber 13, the measuring segment 12 is rotated until the chamber is in alignment with the conduits 28—29. The limiting quadrant 24 positively positions the arm 15 and hence the chamber 13 with respect to the selected pairs of conduits 26—27 and 28—29. It will be apparent that if after the chamber 13 has been filled and the segment 12 rotated only a portion of the distance permitted by the limiting quadrant 24, the sample will remain trapped therein so that it may be discharged at a later time by completing the movement of the arm 15 within the limiting guide 24.

Referring to Figure 3, the metering injection valve in accordance with my invention may be automatically actuated by a drive means 34 controlled by a timer 35. The carrier gas flows from source 32a into upper segment 10 and discharges, when channel 18 or measuring chamber 13 is aligned therewith, from lower segment 11 via line 28 to the instrument or column 37 and thence to the detector 38 which may be provided with a recorder 39.

Typically, the column 37 may comprise a tube about 4 mm. in diameter and about 8 ft. long, packed with an inert solid carrier, and comprises from 10 to 40 weight percent of a stationary liquid phase in accordance with systems well known to those skilled in the art. The detector 38 may comprise a thermal conductivity cell, also well known in the art. Since the details of the column 37 and detector 38 do not constitute a part of this invention, further detail will not be given.

In Figure 3, operating lever or arm 15 is controlled through linkage 40 which is actuated by the hydraulic operator 34, the fluid to the operator 34 being controlled by solenoid valve 41 which is controlled by timer 35. Alternatively, the linkage 40 can be oscillated directly by means of a solenoid type mechanism (not shown) which is controlled by a timer 35.

In describing my invention, I have referred to an embodiment illustrated in the drawings wherein the segment 12 containing the chamber 13 is a member which may be rotated or oscillated about an axis. It is contemplated, however, that this segment 12 may be arranged for oscillation along a line extending between pairs of sample conduits 26—27 and carrier gas supply line 28—29. Operating arm means 15 can be provided and operated in a "push-pull" manner by hydraulic operator 34 and solenoid controller 41 as described in connection with the illustrated embodiment.

I have provided an apparatus capable of repeatedly delivering uniformly sized samples for use in routine analytical procedures. My apparatus delivers accurate and precise samples which assures repeatable analytical precision. Further, such analytical procedures are simplified significantly by the use of my device thereby making possible the adaptation of gas chromatography, for example, to routine laboratory analysis and to automatic process plant control. I have, accordingly, attained the objects of my invention.

Although the apparatus has been described with reference to preferred embodiments thereof, it is to be understood that these are by way of illustration only. In any event, it is contemplated that modifications and variations may be made in the apparatus and in the mode of using the apparatus without departing from the spirit and scope of the invention.

What I claim is:

1. In a sampling and injecting valve the combination of a valve body assembly, said body assembly comprising first and second spaced segments, an interposed third segment in rotational sliding contact with said first and second segments, a measuring chamber of known volumetric capacity in said third segment, a shaft extending through said segments and about which said third segment rotates, bracket means supporting said shaft and valve body assembly, a first pair of sample conduits extending from said first segment and passing through said bracket to prevent rotation of said first segment, a second pair of injection conduits extending from said second segment and in axial alignment with said first pair of conduits, stop means on said second segment engaging a slot in said bracket and preventing rotation of said second segment, rotating means for said third segment comprising a radially extending arm means adapted to bring said chamber selectively in alignment with aligned conduits in said pairs, rotation-limiting means fixed relative to said first and second segments and restricting the movement of said rotating arm means, and spring means on said shaft urging said three segments in fluid-tight sliding contact.

2. The apparatus of claim 1 wherein said interposed third segment contains said measuring chamber and a by-pass chamber, and wherein said third segment comprises a self-lubricating mass of a waxy plastic material.

3. An apparatus for measuring and charging fluids which comprises an upper segment, a lower segment, bracket means supporting said upper and lower segments, a measuring chamber segment arrayed between said upper and lower segments, said measuring chamber segment being comprised of a self-lubricating plastic material, shaft means extending through all of said segments, means preventing relative rotation of said upper and lower segments, means for maintaining the said segments in fluid-tight array, said last named comprising a coil spring about said shaft and abutting a portion of said bracket to adjustably urge said upper and lower segments into contact with the faces of said measuring chamber segment, measuring chamber means in said measuring chamber segment, a first pair of axially aligned conduits one of said conduits passing through the lower segment and the other of said conduits passing through the upper segments, a second pair of axially aligned conduits one of said conduits in said second pair passing through the lower segment and the other of said conduits in said second pair passing through the upper segment, alignment means for alternately bringing said measuring chamber into register with said first and second pairs of aligned conduits, said alignment means including a radially extending operating arm removably secured to said measuring chamber segment, and limiting means controlling the extent of angular displacement of the measuring chamber means whereby a sample introduced by the first pair of aligned conduits is trapped in said measuring chamber and subsequently discharged therefrom by a second fluid flowing in the second pair of aligned conduits, said measuring chamber means comprising a multiplicity of measuring chambers and a multiplicity of radially extending sockets in the outer wall of the measuring chamber segment, each of said sockets being aligned with one of said chambers and adapted for receiving the said removable operating arm means whereby a selected measuring chamber of desired capacity may be manipulated by the operating arm means between the said first and second pairs of aligned conduits.

4. The apparatus of claim 1 which includes means for alternately bringing said measuring chamber into alignment with said first and second pairs of aligned conduits, drive means for reciprocating said measuring chamber segment and for bringing said measuring chamber into flow alignment alternately with said first and second pairs of aligned conduits, and timer means for controlling said drive means.

References Cited in the file of this patent

UNITED STATES PATENTS

| | | |
|---|---|---|
| 2,680,683 | Obenshain | June 8, 1954 |
| 2,757,541 | Watson et al. | Aug. 7, 1956 |
| 2,830,738 | Sorg et al. | Apr. 15, 1958 |
| 2,833,151 | Harvey | May 6, 1958 |

UNITED STATES PATENT OFFICE

CERTIFICATION OF CORRECTION

Patent No. 2,973,117            February 28, 1961

Raymond O. Conklin

It is hereby certified that error appears in the above numbered patent requiring correction and that the said Letters Patent should read as corrected below.

Column 1, line 40, for "its" read -- is --; column 4, line 48, after "named" insert -- means --.

Signed and sealed this 29th day of August 1961.

(SEAL)
Attest:

ERNEST W. SWIDER
Attesting Officer

DAVID L. LADD
Commissioner of Patents